(12) United States Patent
Lassiter et al.

(10) Patent No.: US 6,900,808 B2
(45) Date of Patent: May 31, 2005

(54) GRAPHICAL DATA DISPLAY SYSTEM AND METHOD

(75) Inventors: Kerry Smith Lassiter, Raleigh, NC (US); Frank Lee Wimmer, Raleigh, NC (US); Alan Darrell Massengill, Cary, NC (US)

(73) Assignee: SAS Institute Inc., Cary, NC (US)

( * ) Notice: Subject to any disclaimer, the term of this patent is extended or adjusted under 35 U.S.C. 154(b) by 333 days.

(21) Appl. No.: 10/113,549

(22) Filed: Mar. 29, 2002

(65) Prior Publication Data

US 2003/0187523 A1 Oct. 2, 2003

(51) Int. Cl.$^7$ ............................................... G09G 5/00
(52) U.S. Cl. .................... 345/440; 345/440.1
(58) Field of Search ............... 345/440, 440.1, 345/440.2

(56) References Cited

U.S. PATENT DOCUMENTS

| | | | |
|---|---|---|---|
| 4,270,772 A | 6/1981 | Bodily | |
| 4,282,655 A | 8/1981 | Tinman | |
| 4,344,145 A | 8/1982 | Chasek | |
| 4,467,323 A | * 8/1984 | Kling et al. | 345/440.1 |
| 4,518,959 A | * 5/1985 | Ueda et al. | 345/440.2 |
| 5,037,305 A | 8/1991 | Aleck | |
| 5,178,544 A | 1/1993 | Aleck | |
| 5,402,225 A | 3/1995 | Stubbs et al. | |
| 5,442,741 A | 8/1995 | Hughes et al. | |
| 5,462,438 A | 10/1995 | Becker et al. | |
| 5,491,779 A | 2/1996 | Bezjian | |
| 5,548,699 A | 8/1996 | Ishida et al. | |
| 5,557,717 A | 9/1996 | Wayner | |
| 5,559,527 A | 9/1996 | Quinn | |
| 5,684,508 A | 11/1997 | Brilman | |
| 6,219,053 B1 | 4/2001 | Tachibana et al. | |
| 6,320,586 B1 | 11/2001 | Plattner et al. | |
| 6,343,508 B1 | 2/2002 | Feller | |

OTHER PUBLICATIONS

Imprint Products and Services–Ergometrics, www.users.bigpond.net.au/blacklight/imprint/ergo.htm, Feb. 25, 2002 (8 pgs.).
Ergometrics–Product Information, www.ergometrics.com/specs.htm, Mar. 5, 2002 (3 pgs.).
Ergometrics Balanced Scorecard, Key Performance Indicators, Benchmarking and KPI's, www.ergometrics.com, Mar. 5, 2002 (1 pg.).
Ergometrics–FAQ, www.ergometrics.com/FAQ.htm, Mar. 5, 2002 (2 pgs.).
The Graphical Representation of Data, www.kcl.ac.uk/humanities/cch/pg/course/graphical_rep/graphmain.html, Mar. 5, 2002 (3 pgs.).
Slides, Matthew Swartzwelder, AN/BQQ–6 Passive Sonar System and Related Systems, Nov. 28, 2000 (19 pgs.).
Ergometrics–Gauge Explanations, www.ergometrics.com/gauge–explanation.htm, Aug. 6, 2002 (2 pgs.).

* cited by examiner

*Primary Examiner*—Jeffery Brier
(74) *Attorney, Agent, or Firm*—Jones Day

(57) ABSTRACT

A graphical data display facilitates the analysis of source data values with respect to a data characteristic by arranging a plurality of display bands with corresponding display indicators according to the characteristic.

29 Claims, 13 Drawing Sheets

GRAPHICAL DATA DISPLAY SYSTEM AND METHOD

BACKGROUND

1. Field of the Invention

The present invention is related to a system and method for presenting information for analysis. More particularly, the present invention relates to graphical data displays.

2. Description of the Related Art

Graphical representation of data provides insight into important characteristics of the data. Certain graphical representations of data are known, including pie charts, donut charts, bar charts, waterfall charts, probability graphs, etc. However, when illustrating these data characteristics, many of these known graphical methods introduce data clutter into the graphical data displays. Consequently, one viewing the graphical data display cannot readily ascertain important characteristics about the data.

SUMMARY

According to the teachings of the present invention, a graphical data display is provided for facilitating analysis of a plurality of source data values with respect to a predetermined data characteristic. The graphical data display includes a plurality of display bands which have a spatial arrangement with respect to each other in order to visually provide information regarding the data characteristic. Certain aspects of the display are presented so as to more effectively convey information about the data characteristic.

Further areas of applicability of the present invention will become apparent from the following detailed description. It should be understood that the detailed description and exemplary embodiments of the invention are intended only for illustrative purposes, because various changes and modifications within the scope and spirit of the invention will become apparent to those of ordinary skill in the art.

DETAILED DESCRIPTION

Figure 1:
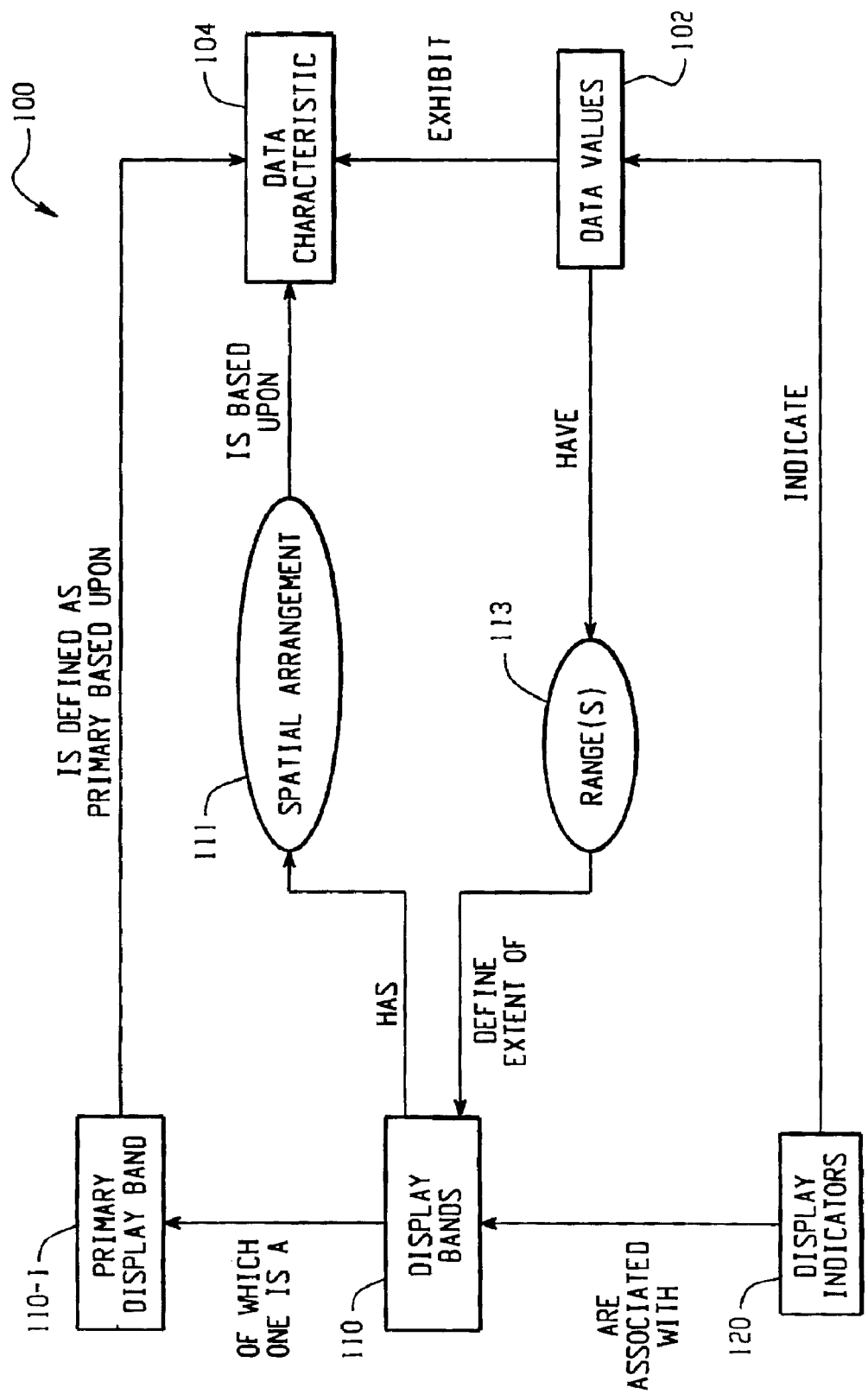
FIG. 1 is a block diagram illustrating components of a graphical data display.

FIG. 1 shows components of a graphical data display 100 that facilitates visual analysis of data values 102. Among other things, the graphical data display 100 emphasizes one or more data characteristics 104 of the data values 102. Just as varied as the type of data values 102 that the graphical data display 100 can show, so are the types of data characteristics that can be emphasized. For example in a business setting, a chronological characteristic of a company's department performance numbers may be emphasized by the graphical data display 100 in order to show how a department has performed over time.

The graphical data display 100 employs a series of visual display bands to show the values 102 of the data. The display bands 110 have a spatial arrangement 111 with respect to each other in order to visually provide information about the data characteristic 104. For example, the display bands may be arranged chronologically from a least recent data value to the most recent data value. It should be understood that the data values 102 can be any type of data, such as qualitative or quantitative data, and related to any measurable or derived values. The data values may be obtained automatically (such as by monitoring equipment), or obtained manually from one or more persons, and may be analog or discrete.

The data characteristic 104 can be many different characteristics. This is due in part to the data that exhibits the data characteristics may vary widely. Exemplary data characteristics include chronological characteristics of the data values 102, such as a sort of the data according to most recent data to least recent data, as well as composite characteristics, averaged characteristics, ranking characteristics, mathematical characteristics, and other data characteristics.

Each display band 110 has a display indicator 120, such as a mark or needle, to visually depict a data value 102. The range 113 of the data values 102 defines the boundaries (or display extent) of the bands 110. If the data values 102 represent how many products have been sold through a company's web site, then the ranges 113 for the bands 110 may be defined by the maximum and minimum numbers of the data values 102. If the data values 102 represent a quality evaluation on a scale from zero to ten, then the ranges 113 of the display bands 110 may be from zero to ten. However, it should be understood that the display bands 110 on a single graphical data display 110 may represent different types of data or may represent similar types of data but whose values differ markedly. In these and other situations, the display bands 110 may have differing ranges 113.

To further emphasize a data characteristic 104, one of the display bands 110 may be selected as a primary display band 110-1. If the data characteristic 104 is a chronological data characteristic, then the display band that contains the most recent value of a measurement (or derived value) may be selected as a primary display band 110-1. If the data characteristic 104 that is to be emphasized is which company department has performed the best, then the display band that contains the data value of the best performing department is selected as the primary display band 110-1.

Figure 2:
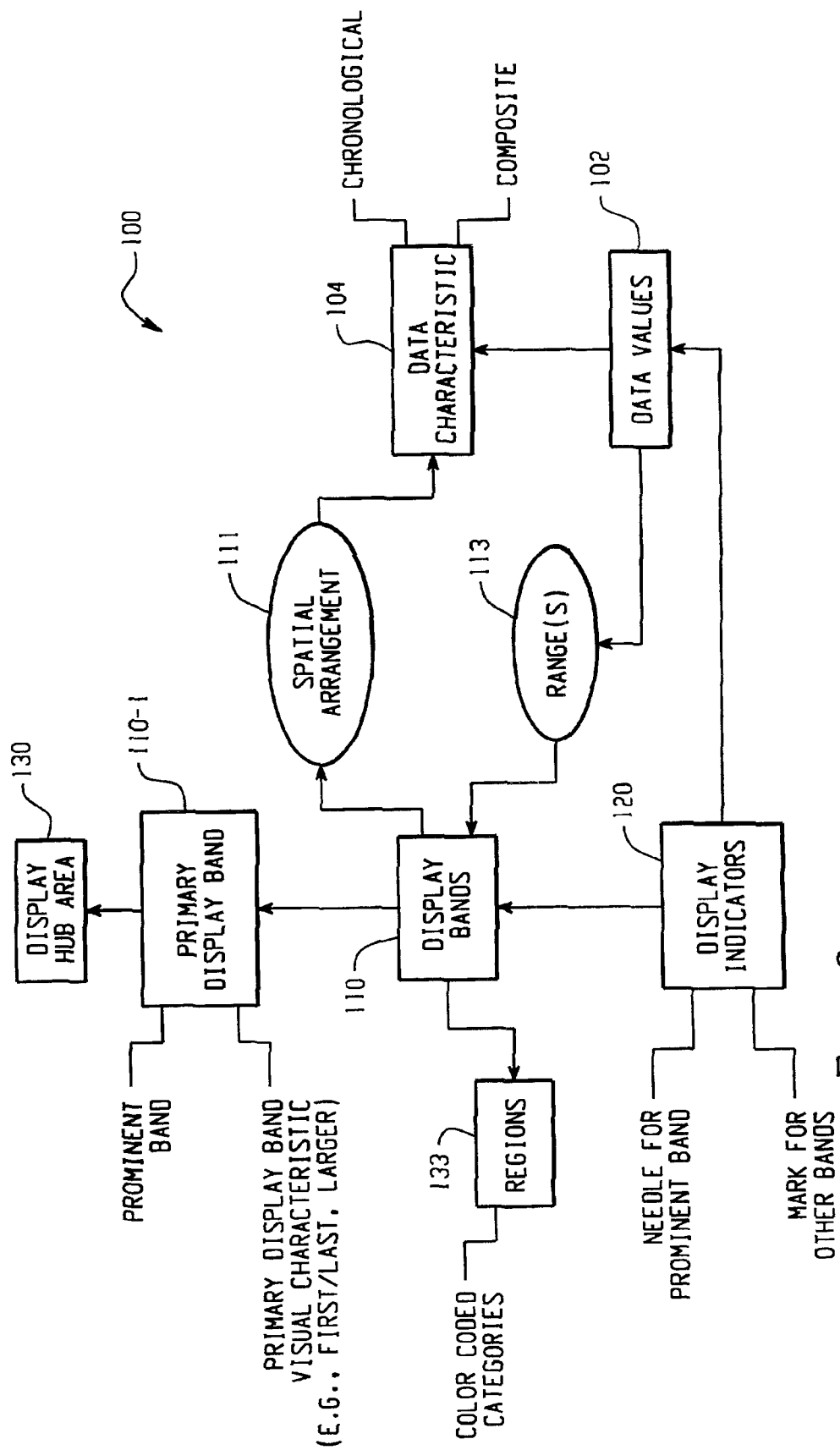
FIG. 2 is a block diagram illustrating components of a different embodiment of a graphical data display.

FIG. 2 shows a different embodiment of a graphical data display 100. Graphical data display 100 includes a hub area 130 that displays the value indicated by the primary band's indicator. The display indicators 120 may include one or more prominently displayed display indicators. Illustratively, a prominent indicator may be a gauge needle style indicator that extends through several display bands into a primary display band 110-1 to indicate the value of the primary display band 110-1. In this embodiment, non-primary bands may use less prominent value indicators, such as marks, ticks, smaller arrows, or dashed arrows that are located only within their respective display bands.

Either with or without a prominent indicator, a primary band 110-1 may be shown in a prominent fashion The primary band 110-1 may have one or more of its visual attributes enhanced, such as size or color, and/or may occupy a prominent position within the graphical data display, such as first in relation to the other display bands or last in relation to the other display bands.

A display band 110 may be segmented into regions 133 to illustrate visually what category the band's value is in. Exemplary categories for a data value may include a data value being in a critical category, a caution category, or a satisfactory category. Color coding may visually remind a user as to which region a category pertains. Red may be used to signify a critical category; yellow may be used to signify a caution category, and green may be used to signify a satisfactory category. Other categories can be shown within the graphical data display 100 depending upon the data at hand.

Figure 3:
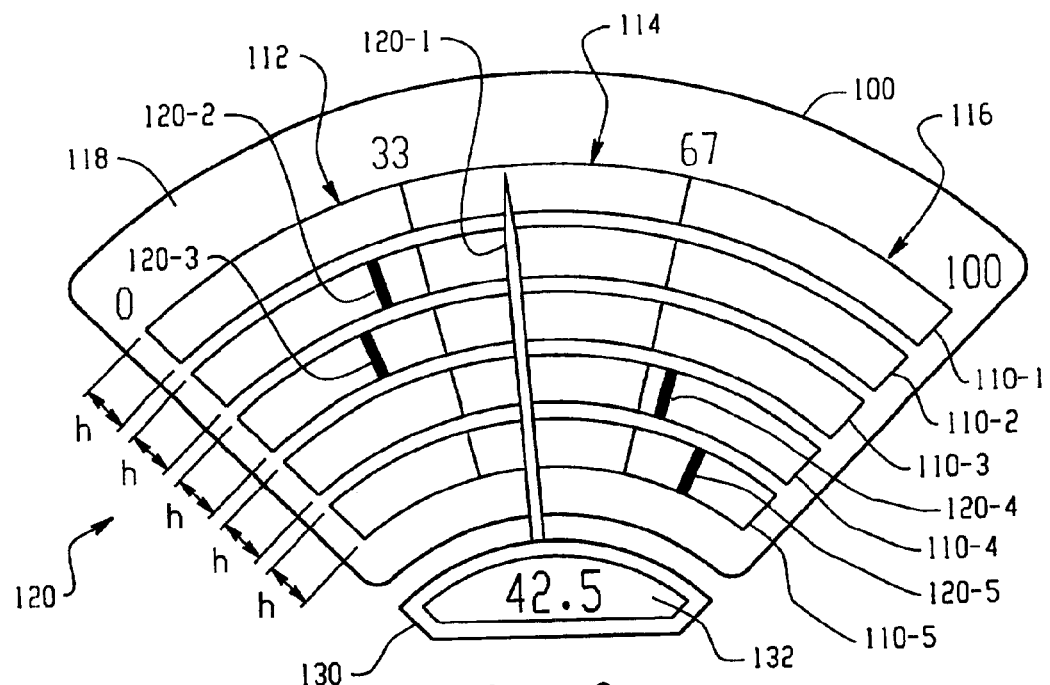
FIG. 3 is an exemplary embodiment of a graphical data display showing five display bands.
Figure 4:
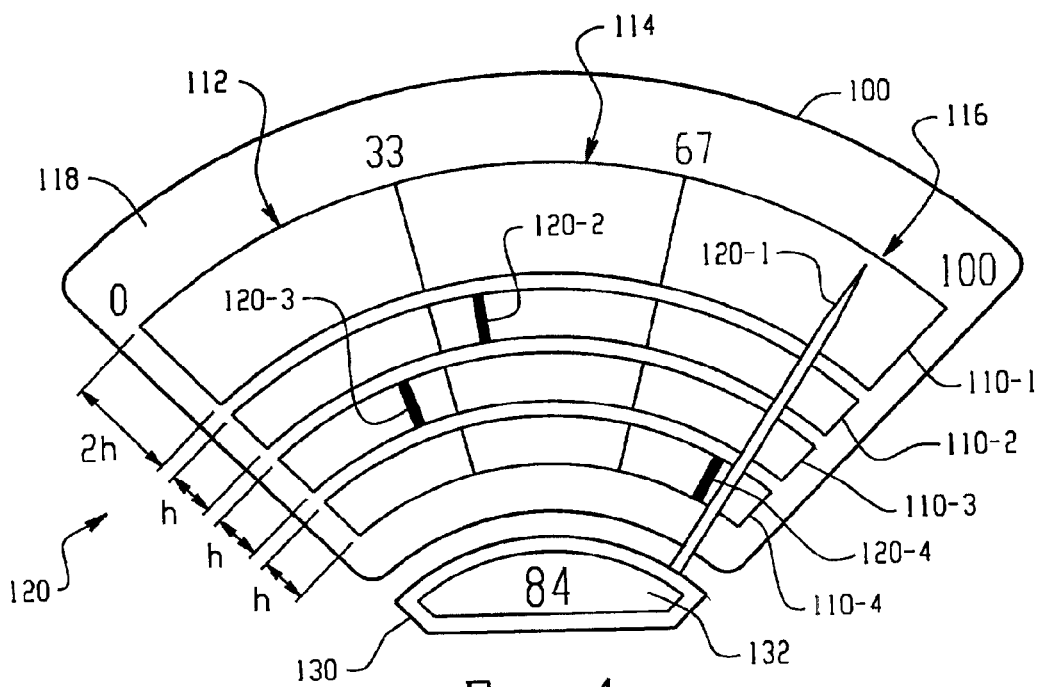
FIG. 4 is an exemplary embodiment of a graphical data display showing four display bands.
Figure 5:
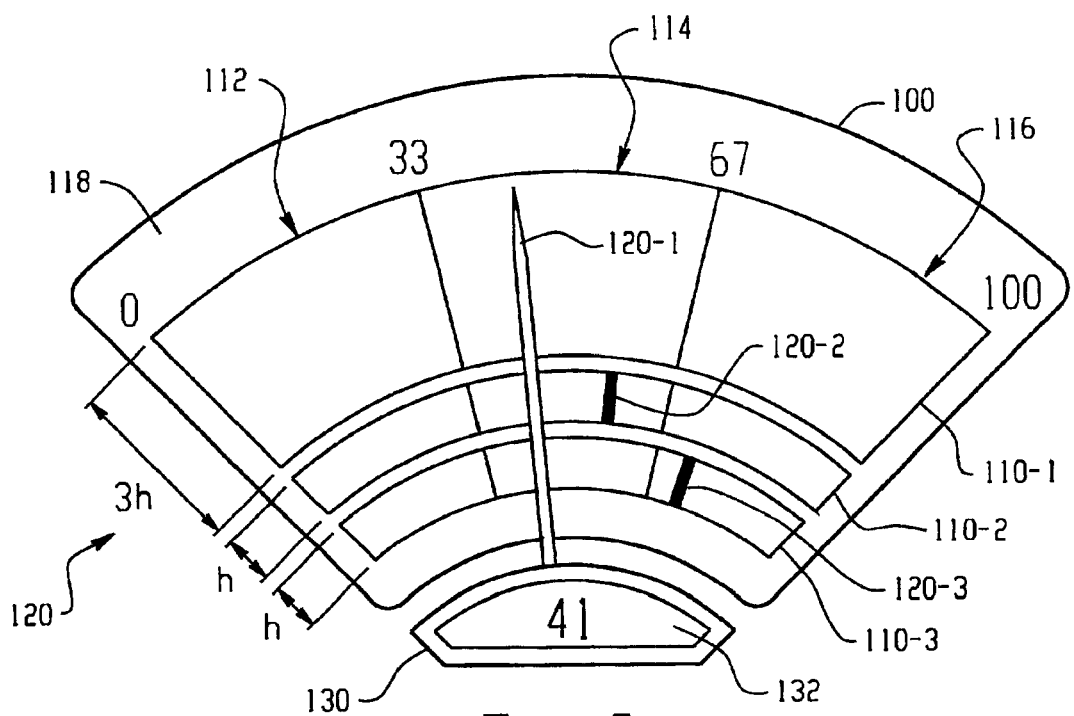
FIG. 5 is an exemplary embodiment of a graphical data display showing three display bands.
Figure 6:
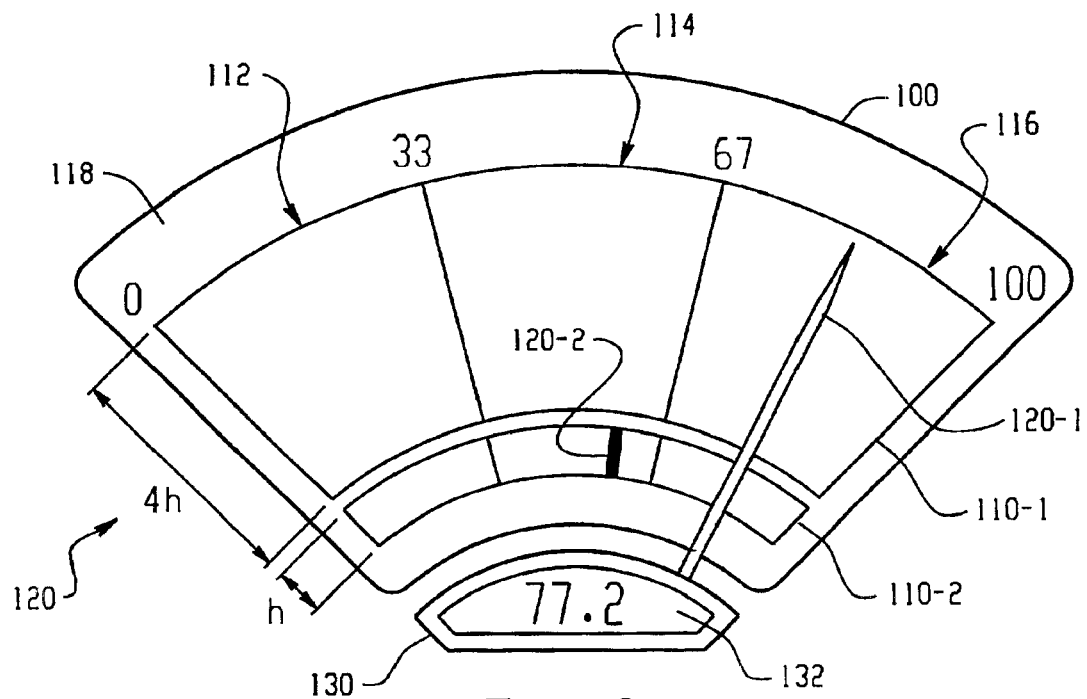
FIG. 6 is an exemplary embodiment of a graphical data display showing two display bands.

An exemplary embodiment of a graphical data display 100 is illustrated with reference to FIGS. 3–6. With reference to FIG. 3, the graphical data display 100 includes five display bands (110-1, 110-2, 110-3, 110-4, 110-5) radially disposed over a partial arc defined by a display area 118 and display hub 130. Each display band (110-1, 110-2, 110-3, 110-4, 110-5) in this example has a range of 0 . . . 100, and is divided into three band regions 112, 114 and 116. Illustratively, the three band regions 112, 114 and 116 each correspond to a third of the range 0 . . . 100, as indicated by the range values 0, 33, 67 and 100.

The display indicators (120-1, 120-2, 120-3, 120-4, and 120-5) are respectively associated with the display bands (110-1, 110-2, 110-3, 110-4, 110-5) such that a display indicator corresponds to a display band. Each display indicator 120 indicates a value in its corresponding display band 110. The value indicated by a display indicator 120 is based upon one or more of the source data values.

In this example, the primary display band 110-1 is prominently displayed and has a prominently displayed display indicator 120-1. Band regions 112, 114 and 116 in the primary display band 110-1 may be color coded to show that a value in a band is within a certain category. Illustratively, band region 112 is red (to show which values are in a critical category), band region 114 is yellow (to show which values are in a caution category), and band region 116 is green (to show which values are in an acceptable category).

In this example, the band regions 112, 114 and 116 of the display bands 110-2, 110-3, 110-4, 110-5 are not individually color coded; however, in a different embodiment, the display bands 110-2, 110-3, 110-4, 110-5 may be individually color coded according to a color gradient which gradually increases beginning with display band 110-1 and ending with display band 110-5. The color gradient may be selected so as to make more prominent the primary display band 110-1. Furthermore, in another different embodiment, the display bands 110-2, 110-3, 110-4, 110-5 may be individually color coded according to a distinct coloring scheme. The distinct coloring scheme may be selected so as to make more prominent the primary display band 110-1.

The display indicator 120-1 of the primary display band 110-1 in this example is a gauge needle style indicator that extends through display bands 110-2, 110-3, 110-4, 110-5 and indicates in the primary display band 110-1 that band's value.

The display hub 130 indicates the current value of the display indicator 120-1 of the primary display band 110-1. The display hub 130 includes a hub region 132 which may be color coded to match the indicated region's color of the primary display band 110-1. For example, the hub region 132 is yellow when the display indicator 120-1 indicates a value in band region 114 of the primary display band 110-1.

The display bands (110-1, 110-2, 110-3, 110-4, 110-5) are spatially arranged with respect to each other to provide information regarding a data characteristic 104. Illustratively, the data characteristic 104 may be quality survey scores for a customer service department over time wherein each band 110-1, 110-2, 110-3, 110-4, 110-5 represents successive monitored time periods. The primary display band 110-1 represents the most recent monitored time period and the display band 110-5 represents the least recent monitored time period. Thus, in this example, it is apparent from the graphical data display 100 of FIG. 3 that quality survey scores for the customer service department have decreased significantly between the fourth most recent and third most recent scores as indicated by the display indicators 120-4 and 120-3 in display bands 110-4 and 110-3, respectively. Furthermore, there was little improvement between the third most recent and second most recent scores as indicated by the display indicators 120-3 and 120-2 in display bands 110-3 and 110-2, respectively. However, there is now a significant improvement over the second most recent score in the latest quality survey score as indicated by the display indicator 120-1 of the primary display band 110-1.

The graphical data display 100 may be specified to display a maximum number of display bands 110 in the display area 118. Illustratively, the graphical data display 100 of FIG. 3 has a specified maximum number of five display bands 110 (of course, the graphical data display 100 may be specified to display more than five display bands 110). Accordingly, each display band 110 is of height h and thus display area 118 is equally divided among the display bands 110-1, 110-2, 110-3, 110-4, 110-5.

If the maximum number of display bands 110 are not displayed, then the primary display band 110-1 may be prominently displayed by increasing its height with respect to the remaining display bands 110. The height increase of the primary display band 110-1 may be proportional to the difference between the maximum number allowed and the number of bands actually displayed. Illustratively in FIG. 4, four display bands 110-1, 110-2, 110-3, 110-4 are displayed. Accordingly, the display bands 110-2, 110-3, 110-4 each are of height h while the primary display band 110-1 is approximately of height 2 h. Similarly in FIG. 5, three display bands 110-1, 110-2, 110-3 are displayed. Thus, the display bands 110-2 and 110-3 each are of height h while the primary display band 110-1 is approximately of height 3 h. Similarly in FIG. 6, the primary display band 110-1 is approximately of height 4 h while the remaining display band 110-2 is of height h.

Figure 7:
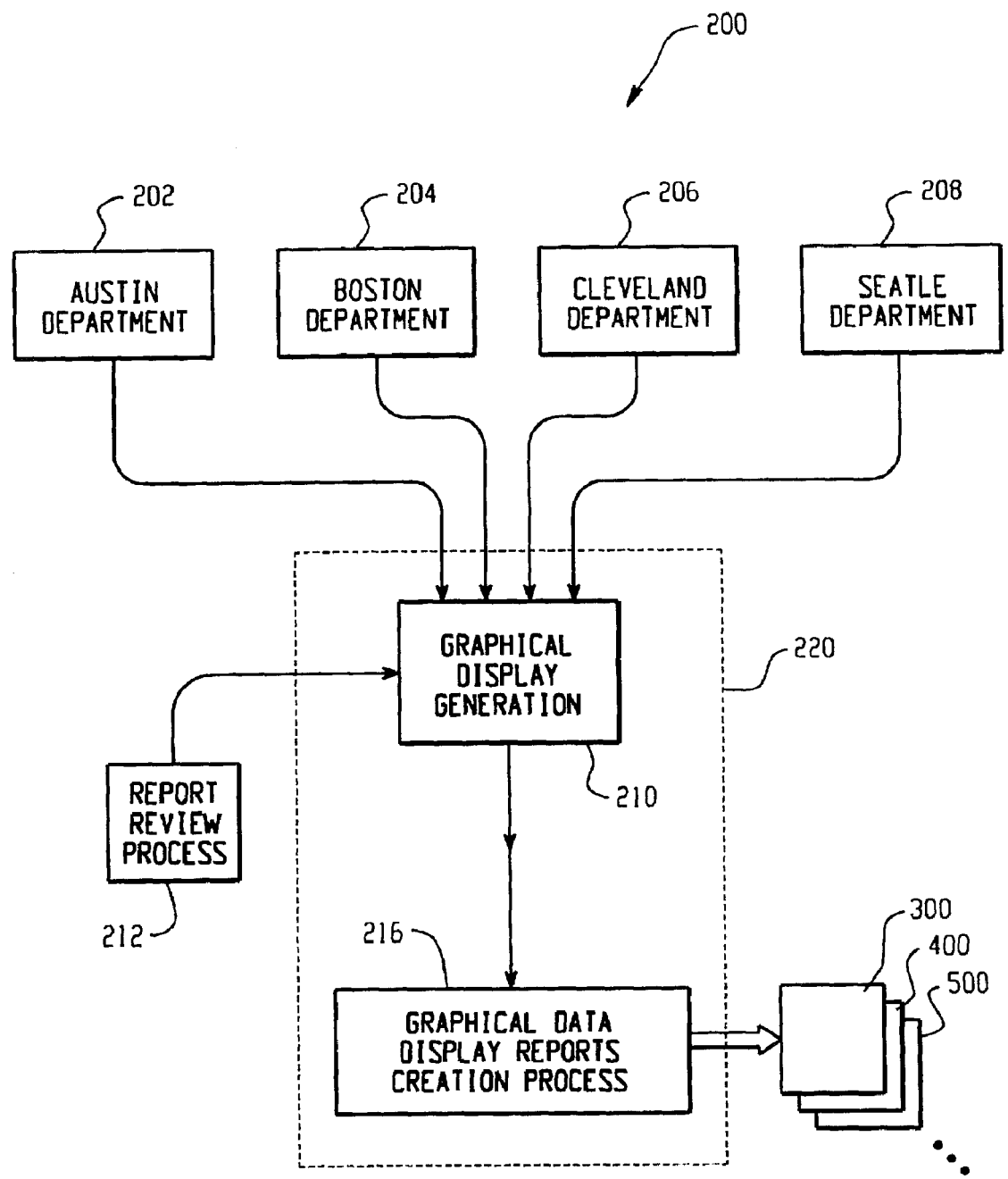
FIG. 7 is a block diagram illustrating an exemplary process of generating graphical data display reports that are related to business metric analysis.

There are many uses for a graphical data display; one of which is described with reference to FIG. 7. FIG. 7 shows an exemplary process 200 for generating graphical data display reports that relate to evaluation metrics of a business. In this example, the business includes an Austin department 202, a Boston department 204, a Cleveland department 206, and a Seattle department 208. Each department provides its department's evaluation business metric (such as percentage of a goal value of gross sales achieved) to a graphical display generation process 210. The graphical display generation process 210 may also receive input from a report review process 212. The report review process 212 may be an organization within the business that ensures the accuracy of the evaluation metrics from the departments.

A plurality of graphical data display reports 300, 400 and 500 are then created, via process 216. The report may be eventually used in the business's annual report. The graphical data displays may be manually created or a computer system 220 may be used to facilitate the graphical display generation process 210 and creation of the graphical data display reports 300, 400 and 500. The graphical data display reports 300, 400 and 500 may be hard copy printed reports, and/or may be stored on a computer-readable storage media.

Figure 8A:
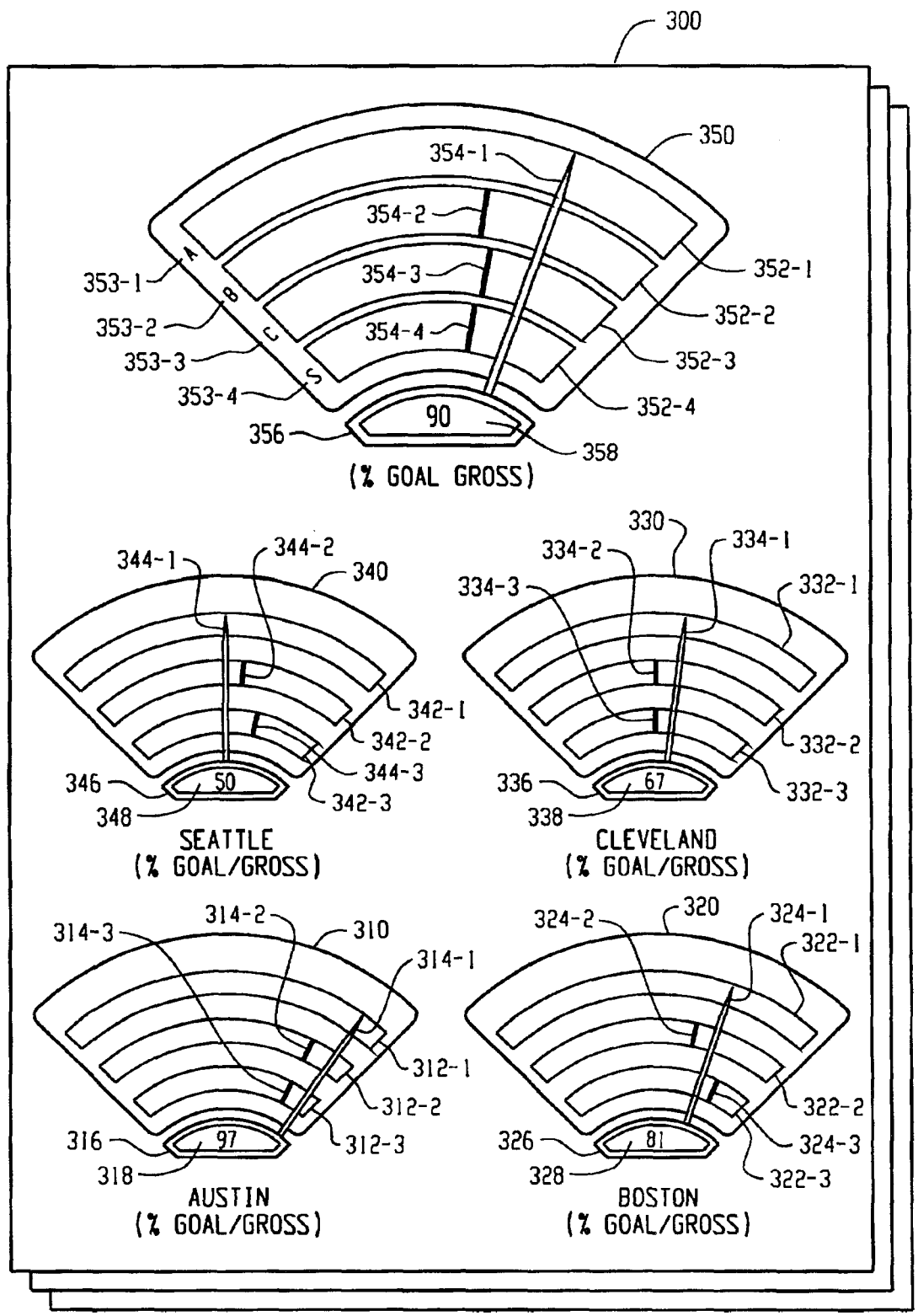
FIG. 8A is an exemplary printed graphical data display report related to a percentage goal of gross regional sales achieved in regional offices and the percentage goal summed for all regional offices.
Figure 8B:
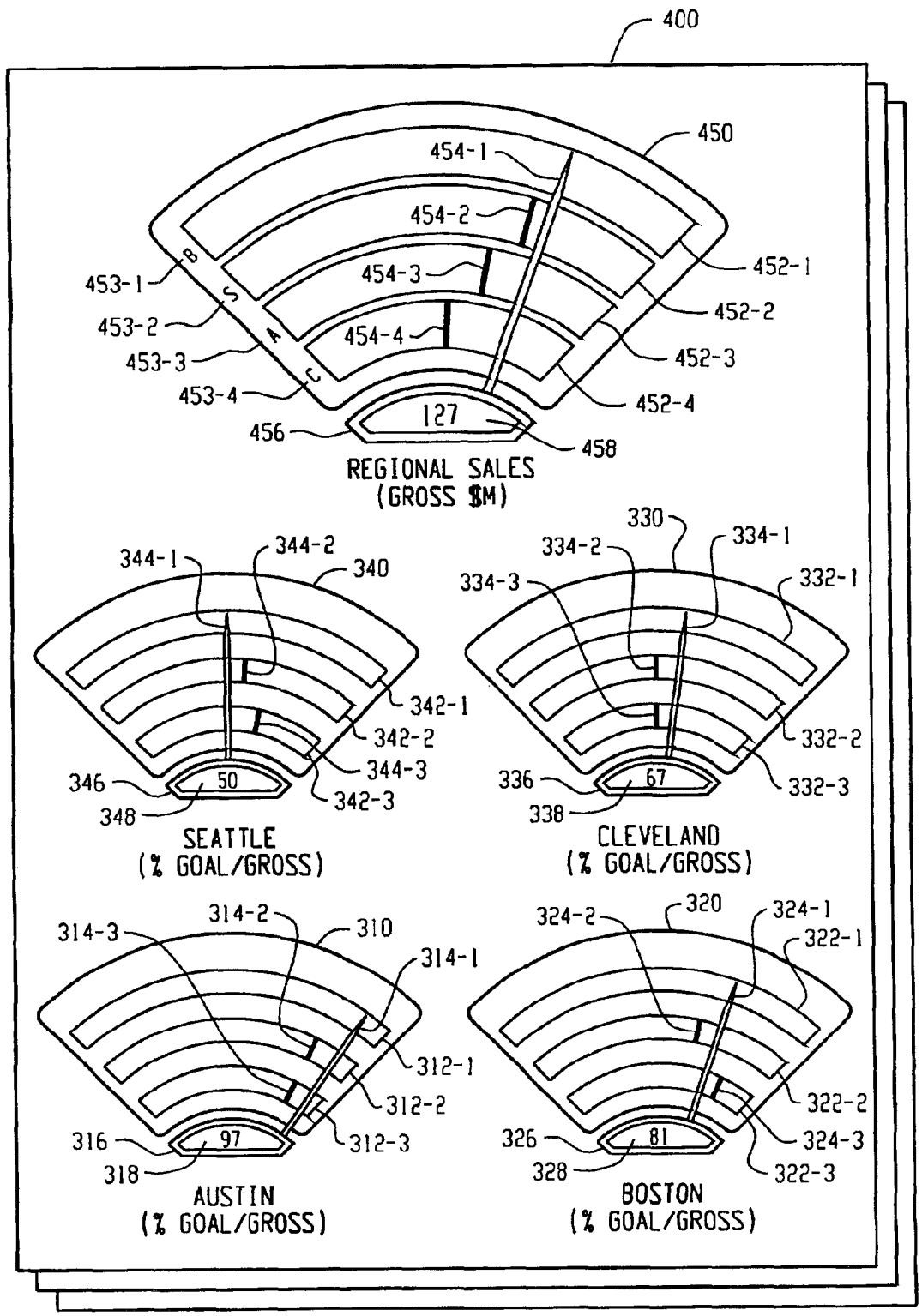
FIG. 8B is an exemplary printed graphical data display report related to the percentage goal of gross regional sales achieved in regional offices and the totaled gross regional sales for all regional offices.
Figure 8C:
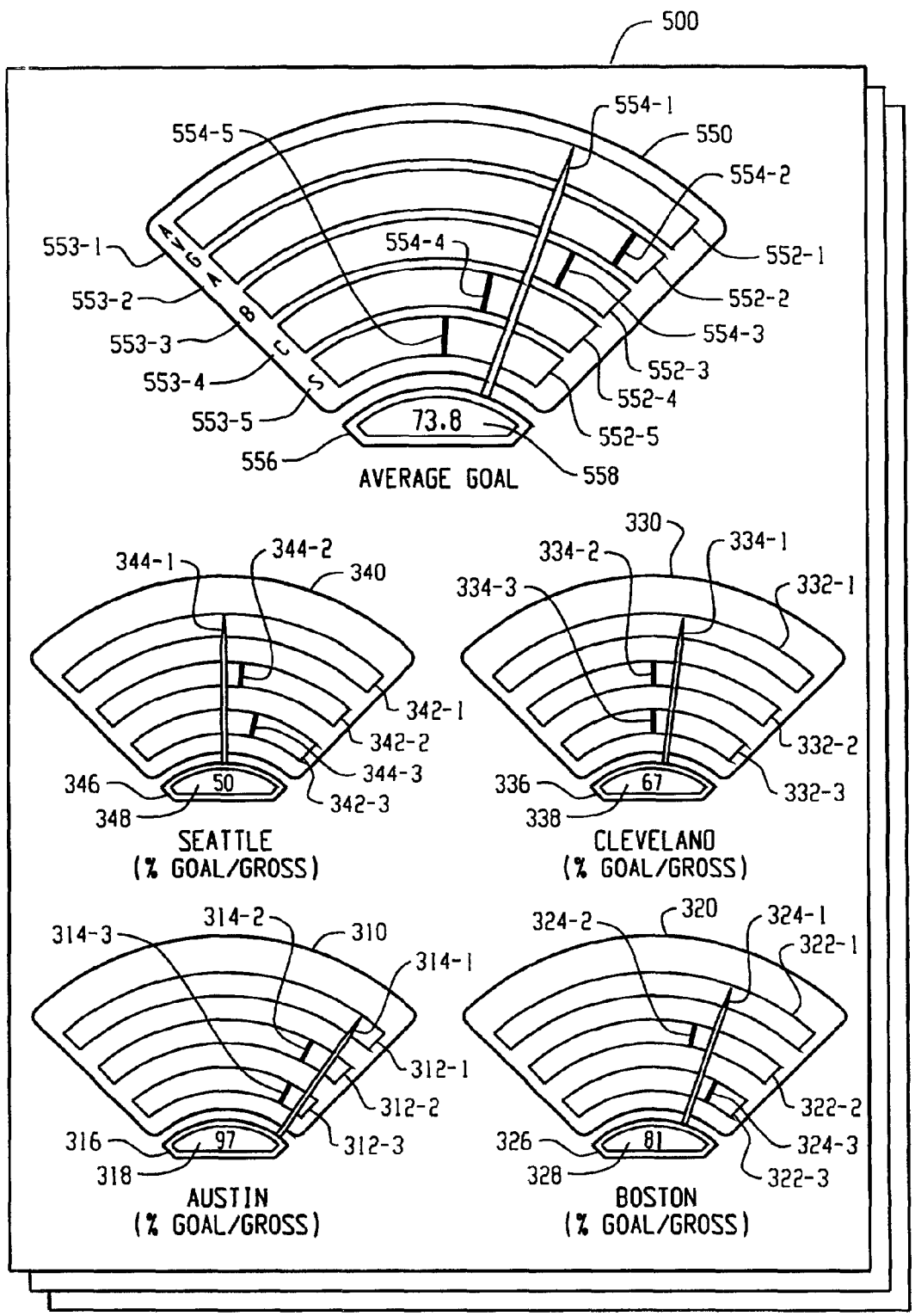
FIG. 8C is an exemplary printed graphical data display report related to the percentage goal of gross regional sales achieved in regional offices and an averaged percentage goal of all regional offices.

For this department evaluation example, different graphical data display reports are illustrated in FIGS. 8A, 8B and 8C. As shown in FIG. 8A, the graphical data display report 300 includes an Austin department data display 310, a Boston department data display 320, a Cleveland department data display 330, and a Seattle department data display 340. The department data displays 310, 320, 330 and 340 relate to their respective department's actual gross sales expressed as a percentage of a goal value of gross sales achieved. Source data for the department data displays 310, 320, 330 and 340 includes gross sales values for each department for the last three quarters, and the goal gross sale value for each department. Centered in the top of the graphical data display report 300 is a summary goal data display 350 that contains for each department an average of a department's quarterly goal gross sales values for the past three time periods.

The Austin department data display 310 shows three display bands 312-1, 312-2, and 312-3. The display indicators 314-1, 314-2, and 314-3 are respectively associated with display bands 312-1, 312-2, and 312-3. Illustratively, each display indicator (314-1, 314-2, 314-3) indicates a quarterly gross sales value. The display band 312-1 corresponds to the most recent quarter and the display band 312-3 corresponds to the least recent quarter. The display band 312-1 includes a prominently displayed display indicator 314-1 which indicates the percentage goal of gross sales achieved for the most recent quarter. As shown in the hub region 318 of the display hub 316, the most recent value is 97%. The display indicators 314-2 and 314-3 indicate the percentage goal of gross sales achieved for the previous two quarters.

The Boston department data display 320 shows three display bands 322-1, 322-2, and 322-3. The display indicators 324-1, 324-2, and 324-3 are respectively associated with display bands 322-1, 322-2, and 322-3. Illustratively, each display indicator (324-1, 324-2, 324-3) indicates a quarterly gross sales value, with the display band 322-1 corresponding to the most recent quarter and the display band 322-3 corresponding to the least recent quarter. The display band 322-1 includes a prominently displayed indicator 324-1 which indicates the percentage goal of gross sales achieved for the most recent quarter. As shown in the hub region 328 of the display hub 326, the most recent value is 81%. The display indicators 324-2 and 324-3 indicate the percentage goal of gross sales achieved for the previous two quarters.

The Cleveland department data display 330 shows three display bands 332-1, 332-2, and 332-3. The display indicators 334-1, 334-2, and 334-3 are respectively associated with display bands 332-1, 332-2, and 332-3. Illustratively, each display indicator (334-1, 334-2, 334-3) indicates a quarterly gross sales value, with the display band 332-1 corresponding to the most recent quarter and the display band 332-3 corresponding to the least recent quarter. The display band 332-1 includes a prominently displayed indicator 334-1 which indicates the percentage goal of gross sales achieved for the most recent quarter. As shown in the hub region 338 of the display hub 336, the most recent value is 67%. The display indicators 334-2 and 334-3 indicate the percentage goal of gross sales achieved for the previous two quarters.

The Seattle department data display 340 shows three display bands 342-1, 342-2, and 342-3. The display indicators 344-1, 344-2, and 344-3 are respectively associated with display bands 342-1, 342-2, and 342-3. Illustratively, each display indicator (344-1, 344-2, 344-3) indicates a quarterly gross sales value, with the display band 342-1 corresponding to the most recent quarter and the display band 342-3 corresponding to the least recent quarter. The display band 342-1 includes prominently displayed display indicator 344-1 which indicates the percentage goal of gross sales achieved for the most recent quarter. As shown in the hub region 348 of the display hub 346, the most recent value is 50%. The display indicators 344-2 and 344-3 indicate the percentage goal of gross sales achieved for the previous two quarters.

Centered in the top of the graphical data display report 300 is a summary goal data display 350. The display band 352-1 corresponds to the most recent value in the Austin data display 310, which is labeled "A" by the display band label 353-1; the display band 352-2 corresponds to the most recent value in the Boston data display 320, which is labeled "B" by the display band label 353-2; the display band 352-3 corresponds to the most recent value in the Cleveland data display 330, which is labeled "C" by band label 353-3; and the display band 352-4 corresponds to the Seattle data display 340, which is labeled "S" by the display band label 353-4.

The primary display band 352-1 includes a prominently displayed indicator 354-1 that indicates an average of the three quarterly goal gross sales values indicated in the Austin data display 310 by display indicators 314-1, 314-2, and 314-3. As shown in the hub region 358 of the display hub 356, the average value is 90%, thus indicating that for the last three quarters, the Austin department 202 has achieved 90% of a goal value of gross sales. Similarly, the display bands 352-2, 352-3, and 352-4 include display indicators 354-2, 354-3, and 354-4 respectively indicating the averages of the three quarterly goal gross sales figures indicated in the Boston, Cleveland and Seattle data displays 320, 330 and 340. The Austin-related band occupies in this example the primary band 350-1 as the data characteristic for display 350 is a descending ranking of performers.

FIG. 8B shows a different data characteristic for determining which data value is depicted in the primary band 454-1. The graphical data display report 400 includes the Austin department data display 310, the Boston department data display 320, the Cleveland department data display 330, and the Seattle department data display 340. However, centered in the top of the graphical data display report 400 is a total gross regional sales data display 450.

The total gross regional sales data display 450 includes display bands 452-1, 452-2, 452-3, 452-4 and display band labels 453-1, 453-2, 453-3, 453-4. The display band 452-1 corresponds to the Boston data display 320, as referenced by the display band label 453-1; the display band 452-2 corresponds to the Seattle data display 340, as referenced by the display band label 453-2; the display band 452-3 corresponds to the Austin data display 310, as referenced by the display band label 453-3; and the display band 452-4 corresponds to the Cleveland data display 330, as referenced by the display band label 453-4.

The primary display band 452-1 includes a prominently displayed display indicator 454-1 that indicates the summed total gross sales for the last three quarters of the Boston department 204. As shown in the hub region 458 of the display hub 456, the total gross sales for the last three quarters for the Boston department 204 is 127 million dollars. Similarly, display bands 452-2, 452-3 and 452-4 include display indicators 454-2, 454-3 and 454-4 that indicate the summed total gross sales for the last three quarters of the Seattle department 208, the Austin department 202, and the Cleveland department 206. The data characteristic of the source data illustrated by the total gross regional sales data display 450 is the summed total gross sales for each department over the last three quarters, arranged in descending order. Accordingly, the primary display band 452-1 relates to the Boston data display 320, as the Boston department 204 has the highest summed total gross sales for the last three quarters.

As shown in FIG. 8C, the graphical data display report 500 includes the Austin department data display 310, the Boston department data display 320, the Cleveland department data display 330, and the Seattle department data display 340. However, centered in the top of the graphical data display report 500 is a department average goal data display 550. The primary display band 552-1 includes a prominently displayed display indicator 554-1 that indicates an average of the values indicated in the primary display bands 312-1, 322-1, 332-1 and 342-1 of data displays 310, 320, 330 and 340. The display label 553-1 indicates that the primary display band relates to the average value. For this company, a critical success factor (CSF) may be the averaged value of the departments, and thus the primary display band 552-1 contains the critical success factor so that the importance of this data characteristic may be further emphasized.

The display band 552-2 and the display indicator 554-2 correspond to the primary display band 312-1 and the prominently displayed display indicator 314-1 of the Austin data display 310, as indicated by the display label 553-2; the display band 552-3 and the display indicator 554-3 correspond to the primary display band 322-1 and the prominently displayed display indicator 324-1 of the Boston data display 320, as indicated by the display label 553-3; the display band 552-4 and the display indicator 554-4 correspond to the primary display band 332-1 and the prominently displayed display indicator 334-1 of the Cleveland data display 330, as indicated by the display label 553-4; and the display band 552-5 and the display indicator 554-5 correspond to the primary display band 342-1 and the prominently displayed display indicator 344-1 of the Seattle data display 340, as indicated by the display label 553-5.

As shown in the hub region 558 of the display hub 556, the average value of the values indicated in the primary display bands 312-1, 322-1, 332-1 and 342-1 is 73.8%. The data characteristic of the source data illustrated by the average goal data display 550 is the averaged percentage goal of the Austin department 202, Boston department 204, Cleveland department 206 and the Seattle department 208 for the most recent quarter.

The graphical data display reports 300, 400 and 500 are hard copy reports. Alternatively, these same reports may be displayed on a computer screen. Furthermore, when the graphical data display reports are displayed on a computer screen, the user may select a particular display band of a graphical data display to obtain a graphical data display related to the particular display band. For example, selecting the display band 322-2 of the Boston data display 320 creates a quarterly data display for the quarter represented by the display band 322-2. The quarterly data display includes three display bands, each corresponding to a particular month in the selected quarter.

Figure 9:
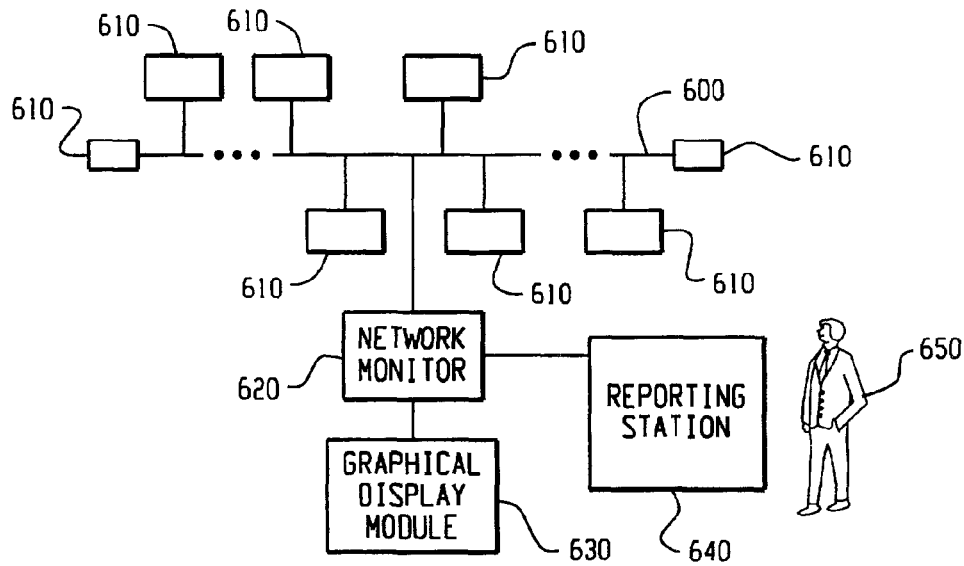
FIG. 9 is an exemplary graphical data display system for generating graphical data displays related to real-time network monitoring.

FIG. 9 illustrates another use of the graphical data display system. In this example, graphical data displays are generated to analyze data from a real-time computer network monitoring system 620. The computer network monitoring system 620 monitors a network 600 that interconnects computers 610. The computer network monitoring system 620 monitors the network 600 for such performance characteristics as error rate, demand, resource allocation, and the number of users logged on the network 600.

A graphical display module 630 receives the monitored network performance metrics and generates graphical data displays to illustrate the performance metrics of the network in real time. The reporting station 640 is a computer that provides an interface to a user 650 to view the generated graphical data displays.

The graphical display module 630 preferably comprises computer executable instructions, and may be executed on the network monitoring system 620 or on the reporting station 640. Alternatively, the graphical display module 630 may be executed on one of the computers 610 connected to the network 600.

Figure 10:
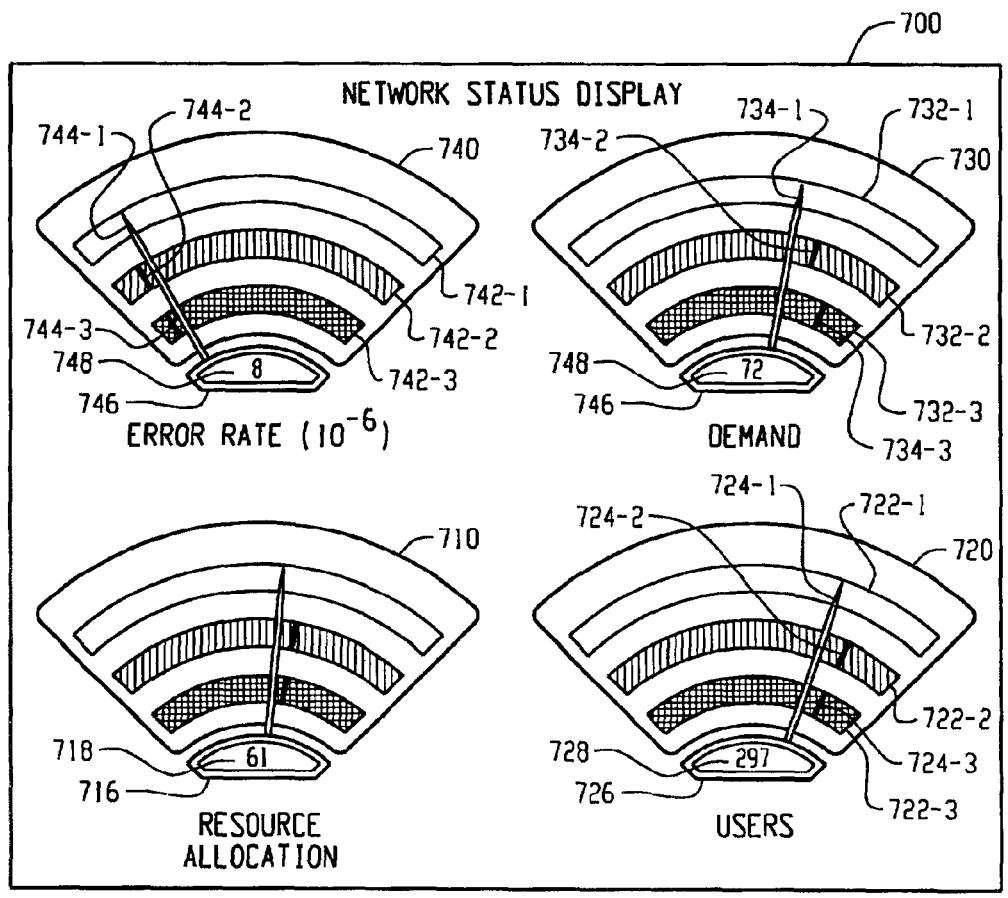
FIG. 10 is an exemplary graphical data display screen for the system shown in FIG. 9.

FIG. 10 shows an exemplary graphical data display screen 700 that might be generated by the graphical display model 630 of FIG. 9. The graphical data display screen 700 includes a resource allocation graphical data display 710, a users graphical data display 720, a demand graphical data display 730, and an error rate graphical data display 740.

The resource allocation department data display 710 shows three display bands 712-1, 712-2, and 712-3. Illustratively, each display band (712-1, 712-2, 712-3) represents a real time measurement of resource allocation. The real time measurement may be an instantaneous measurement, or may be a measurement averaged over a monitoring period, such as a thirty second monitoring period. The primary display band 712-1 includes a prominently displayed display indicator 714-1, which indicates the most recent measurement. As shown in the hub region 718 of the display hub 716, the most recent measurement has a value of 61. The display indicators 714-2 and 714-3 located in the corresponding display bands 712-2 and 712-3 indicate the previous two measurements and are color coded according to a color gradient that further emphasizes the prominence of the primary display band 712-1.

Once a new measurement is obtained, the prominently displayed display indicator 714-1 is updated to indicate the new measurement. The display indicator 714-2 is updated to reflect the value indicated by the prominently displayed display indicator 714-1 prior to the update of the prominently displayed display indicator 714-1. Likewise, the display indicator 714-3 is updated to reflect the value indicated by the display indicator 714-2 prior to the update the display indicator 714-2. Accordingly, the new measurement is indicated in the primary display band 712-1 and the two most recent measurements are shifted into the display bands 712-2 and 712-3, respectively. Thus, the data characteristic of the source data illustrated is a chronological history of real-time, or near real-time, measurements of resource allocation.

The users data display 720 shows three display bands 722-1, 722-2, and 722-3. Illustratively, each display band (722-1, 722-2, 722-3) represents the number of users logged on the network 600. The real time measurement may be an instantaneous measurement, or may be a measurement averaged over a monitoring period, such as a thirty second monitoring period. The primary display band 722-1 includes a prominently displayed display indicator 724-1, which indicates the most recent measurement. As shown in the hub region 728 of the display hub 726, the most recent measurement has a value of 297. The display indicators 724-2 and 724-3 located in the corresponding display bands 722-2 and 722-3 indicate the previous two measurements and are color coded according to a color gradient that further emphasizes the prominence of the primary display band 722-1.

Once a new measurement is obtained, the users data display 720 is updated in the same manner that the resource allocation data display 710 is updated. Thus, the data characteristic of the source data illustrated is a chronological history of users logged on the network.

The demand data display 730 shows three display bands 732-1, 732-2 and 732-3. Illustratively, each display band (732-1, 732-2, 732-3) represents the system demand of the network 600. The real time measurement may be an instantaneous measurement, or may be a measurement averaged over a monitoring period, such as a thirty second monitoring period. The display band 732-1 includes a prominently displayed display indicator 734-1, which indicates the most recent measurement. As shown in the hub region 738 of the display hub 736, the most recent measurement is 72. The display indicators 734-2 and 734-3 located in the corresponding display bands 732-2 and 732-3 indicate the previous two measurements and are color coded according to a color gradient that further emphasizes the prominence of the primary display band 732-1.

Once a new measurement is obtained, the demand data display 730 is updated in the same manner that the resource allocation data display 710 is updated. Thus, the data characteristic of the source data illustrated is a chronological history of system demand of the network 600.

The error rate data display 740 shows three display bands 742-1, 742-2 and 742-3. Illustratively, each display band (742-1, 742-2, 742-3) represents the system error rate of the network 600. The measurement is averaged over a monitoring period, such as one second monitoring period. The display band 742-1 includes a prominently displayed display indicator 744-1, which indicates the most recent measurement. As shown in the hub region 748 of the display hub 746, the most recent measurement is 0.000008. The display indicators 744-2 and 744-3 located in the corresponding display bands 742-2 and 742-3 indicate the previous two measurements and are color coded according to a color gradient that further emphasizes the prominence of the primary display band 742-1.

Once a new measurement is obtained, the demand data display 740 is updated in the same manner that the resource allocation data display 710 is updated. Thus, the data characteristic of the source data illustrated is a chronological history of the error rate of the network 600.

Figure 11:
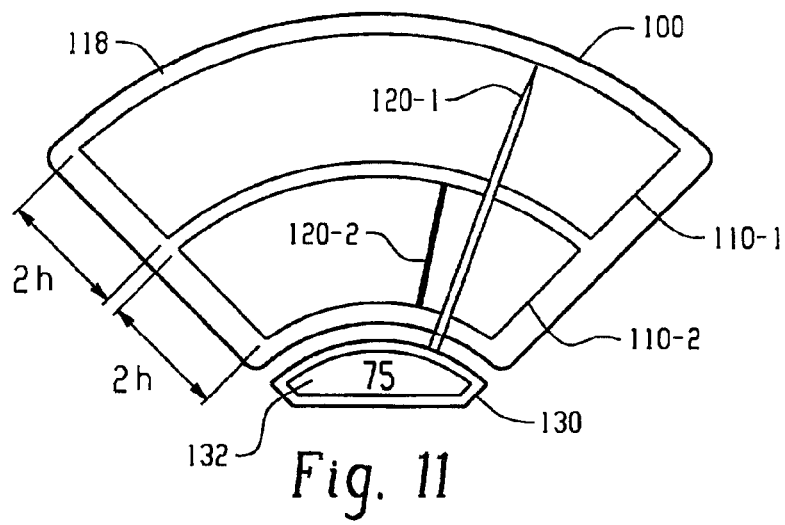
FIG. 11 is an exemplary graphical data display showing two display bands wherein the bands are equally divided over a display region.
Figure 12:
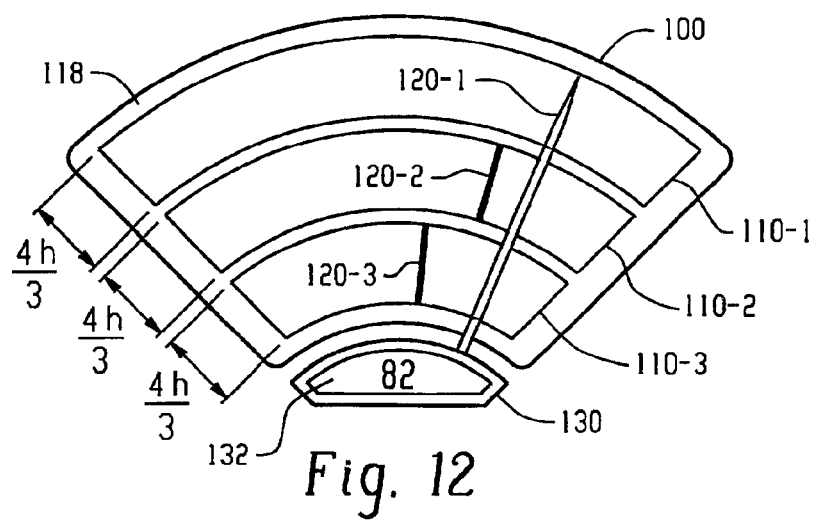
FIG. 12 is an exemplary graphical data display showing three display bands that are equally divided over the display region.
Figure 13:
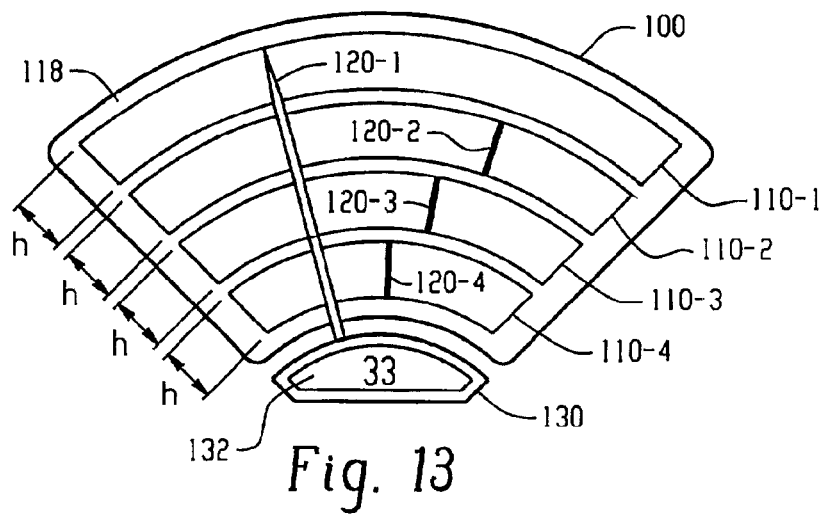
FIG. 13 is an exemplary graphical data display showing four display bands that are equally divided over the display region.

FIGS. 11–13 show a different embodiment of a graphical data display 100. In this embodiment, each display band 110 is of equal height, and per a user's request a maximum number of four display bands 110 is to be displayed. FIG. 11 shows the graphical data display 100 including a primary display band 110-1 and another display band 110-2 spatially arranged according to a chronological data characteristic. The prominently displayed indicator 120-1 indicates the most recent value in the primary display band 110-1 Both display bands 110-1 and 110-2 are the same height 2 h.

FIG. 12 shows the graphical data display 100 including a third measurement in a third display band 110-3. The new measurement is indicated in the primary band 110-1 by the prominently displayed display indicator 120-1, and the previous two measurements are chronologically displayed in the display bands 110-2 and 110-3. The height of each display band 110-1, 110-2, and 110-3 is again equal; however, because another display band 110-3 has been added to the display region 118, the height of each display band 110 has been reduced from 2 h to 4 h/3.

FIG. 13 shows the graphical data display 100 including a fourth measurement in a fourth display band 110-4. The new measurement is indicated in the primary band 110-1 by the prominently displayed display indicator 120-1, and the previous three measurements are chronologically displayed in the display bands 110-2, 110-3, and 110-4. The height of each display band 110-1, 110-2, 110-3, 110-4 is again equal; however, because another display band 110 has been added to the display region 118, the height of each display band 110 has been reduced from 4 h/3 to h.

The maximum number of display bands are displayed in FIG. 13 with the height of the display bands remaining fixed at height h. When a new measurement is indicated in the primary display band 110-1, the least recent measurement in the display band 110-4 will be removed. The measurements in display bands 110-2, 110-3 and 110-4 are then updated in a similar manner as described with reference to the resource allocation display 710 above.

Figure 14:
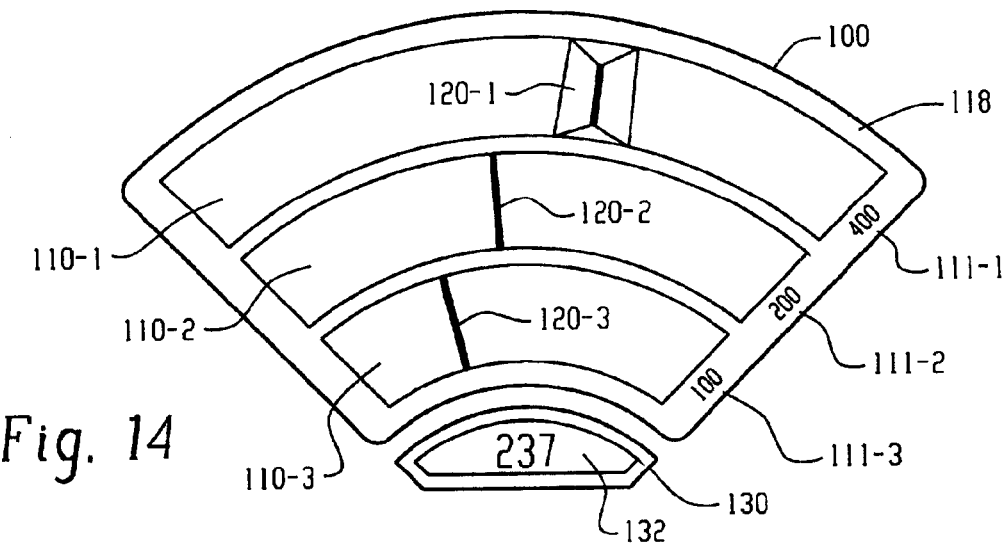
FIG. 14 is an exemplary graphical data display showing a prominently displayed indicator in a primary display band.

FIG. 14 shows a different embodiment of a graphical data display 100 that includes a prominently displayed display indicator 120-1 located in the primary band 110-1. The prominently displayed display indicator 120-1 is illustratively a slide rule style indicator located in the primary band 110-1. The value of the prominently displayed display indicator 120-1 is displayed in the hub region 132 of the display hub 130.

Furthermore, the graphical data display 100 of FIG. 14 may include multiple display band ranges, as denoted by the range labels 111-1, 111-2, and 111-3 adjacent the display bands 110-1, 110-2, and 110-3. It should be understood that lower range labels may also be shown on the graphical data display 100 to illustrate the lower range for each display band 110-1, 110-2, and 110-3. Moreover, different units for the display bands 110-1, 110-2, and 110-3 may be used, such as logarithmic, exponential, multiplied, etc.

Figure 15:
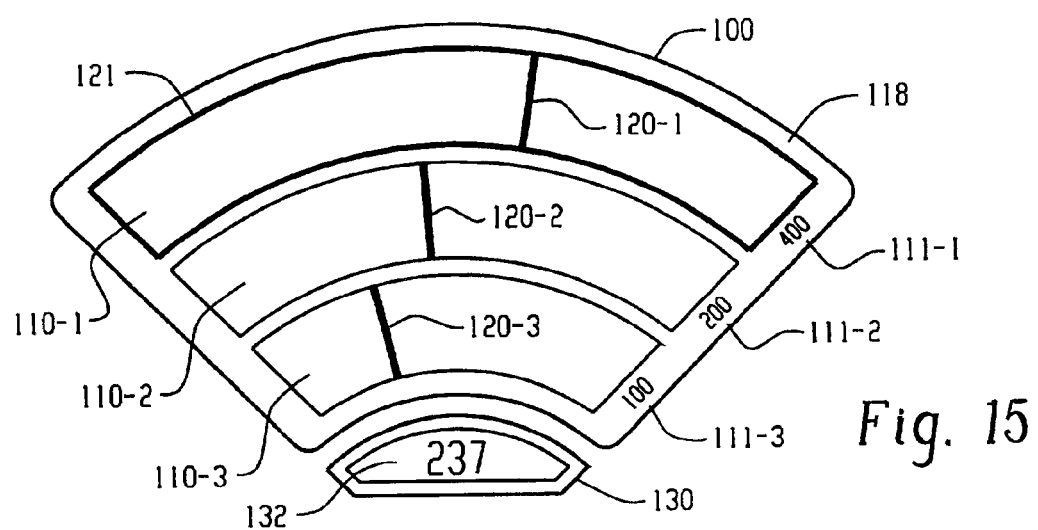
FIG. 15 is an exemplary graphical data display that contains a primary display band being prominently displayed.

FIG. 15 is a different embodiment of a graphical data display 100 that uses heavily shaded borders 121 to prominently display the primary band 110-1.

Figure 16:
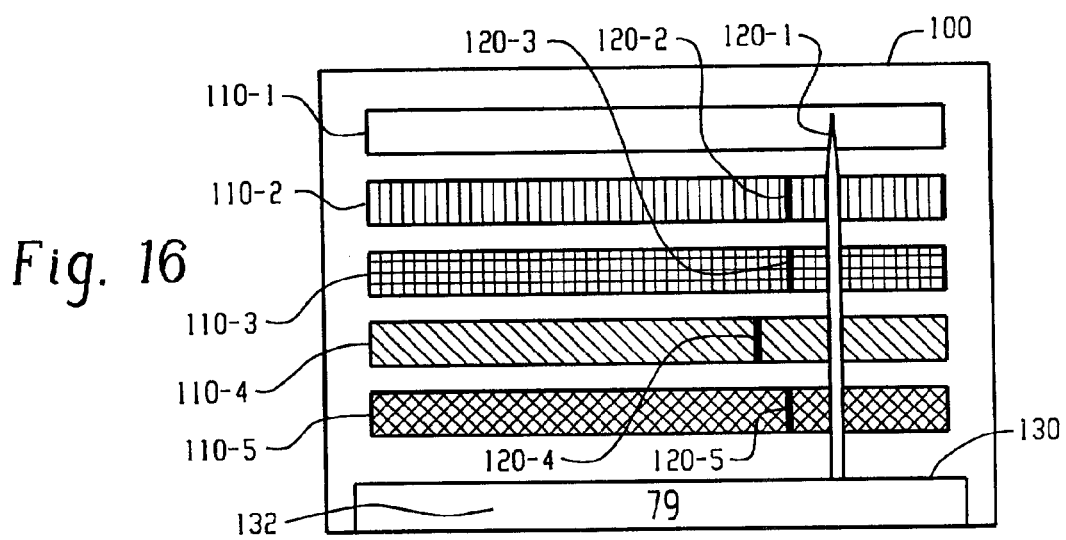
FIG. 16 is an exemplary graphical data display that includes linear bands.

FIG. 16 is a different embodiment of a graphical data display 100 wherein the graphical data display 100 includes display bands 110-1, 110-2, 110-3, 110-4, 110-5 that are linearly disposed. The linear display bands 110-1, 110-2, 110-3, 110-4, 110-5 may be shaded according to a color gradient in which the primary display band 110-1 defines one end of the color gradient. A gauge needle style display indicator 120-1 indicates a value in the primary display band 110-1, and the display indicators 120-2, 120-3, 120-4, 120-5 indicate values in the remaining display bands 110-2, 110-3, 110-4, 110-5. The display hub 130 displays the value indicated by the gauge needle style display indicator 120-1 in the hub region 132.

While the illustrative embodiments of FIGS. 3–16 have one display indicator 120 indicating a value in each display band 110, it is to be understood that more than one display indicator 120 may be displayed in a display band 110.

Figure 17:
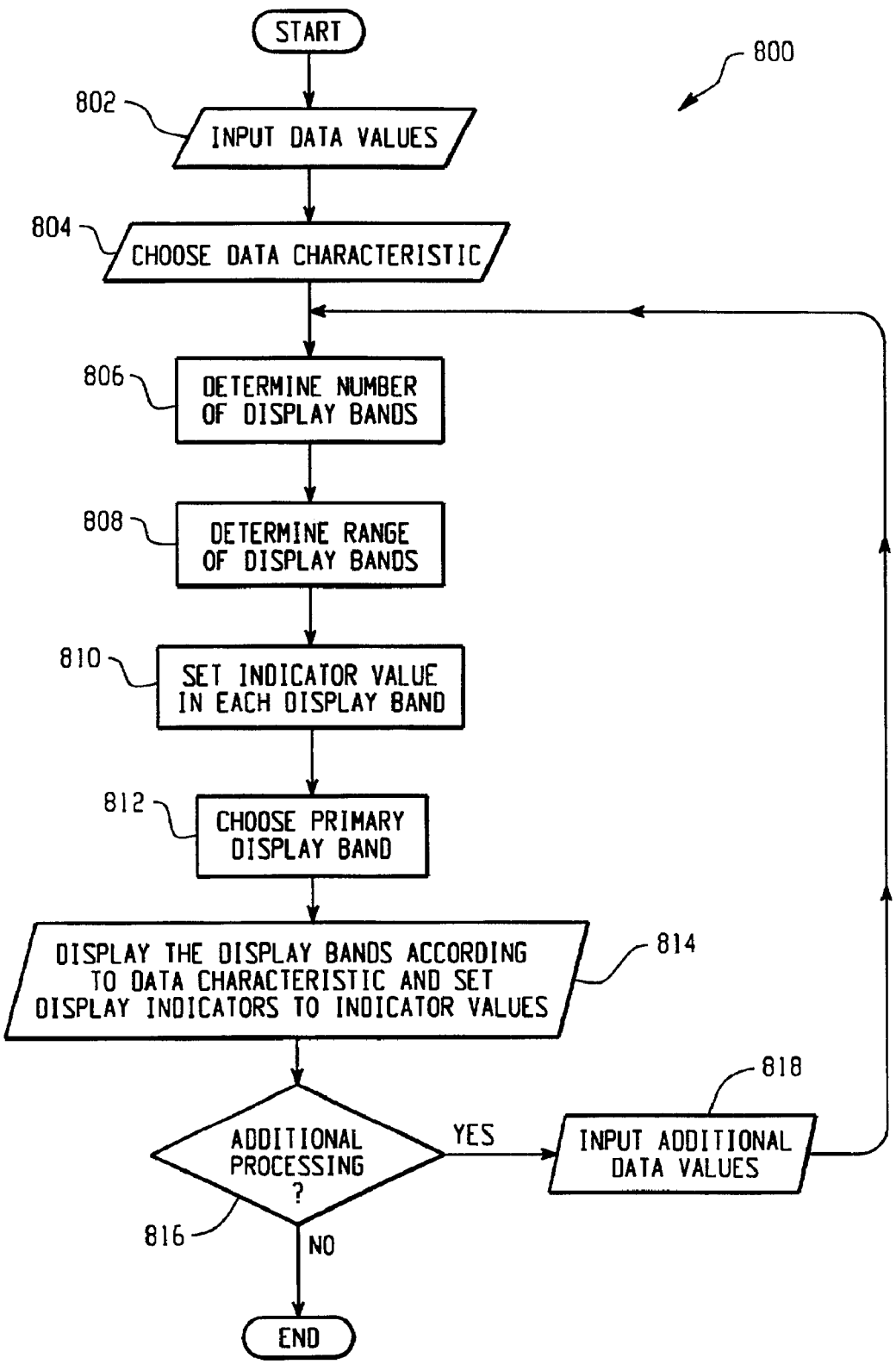
FIG. 17 is a flow chart illustrating an exemplary process of creating a graphical data display.

FIG. 17 provides a flow diagram 800 illustrating an exemplary process of creating a graphical data display. The process of the flow diagram 800 is preferably realized by executing a graphical data display software module comprising computer executable instructions. In step 802, a plurality of data values are input for processing. The data values include data related to business metrics, scientific measurements, or other subjects or systems in which measurements are commonly obtained.

In step 804, a data characteristic to be illustrated in a graphical data display is chosen, such as the most recent data value should be shown in the primary display band. In step 806, the number of display bands to be displayed is determined. The number of display bands to be displayed may be based upon the amount of the area that the display is allowed to consume. Alternatively, a user specifies the number of display bands.

In step 808, the range for each display is determined. The ranges are based on the input data values or may be specified by the user (or a combination of both). In step 810, an indicator value in each display band is set. The indicator value specifies a value in the display band to be indicated by the display indicator. The indicator value is based on the input data values.

In step 812, a primary display band is chosen. The primary display band is chosen based on the data characteristic. Illustratively, if the data characteristic is a chronological data display, the primary display band is the most recent data value. In step 814, the display bands are displayed, and the display indicators are set to the indicated values in each display band.

Step 816 determines whether additional processing for additional data values is needed. If additional processing is required, the additional data values are supplied to the process in step 818. After the additional data values are input, steps 806, 808, 810, 812 and 814 are again executed to provide an updated graphical data display. However, if additional processing is not required, then the process is terminated.

Figure 18:
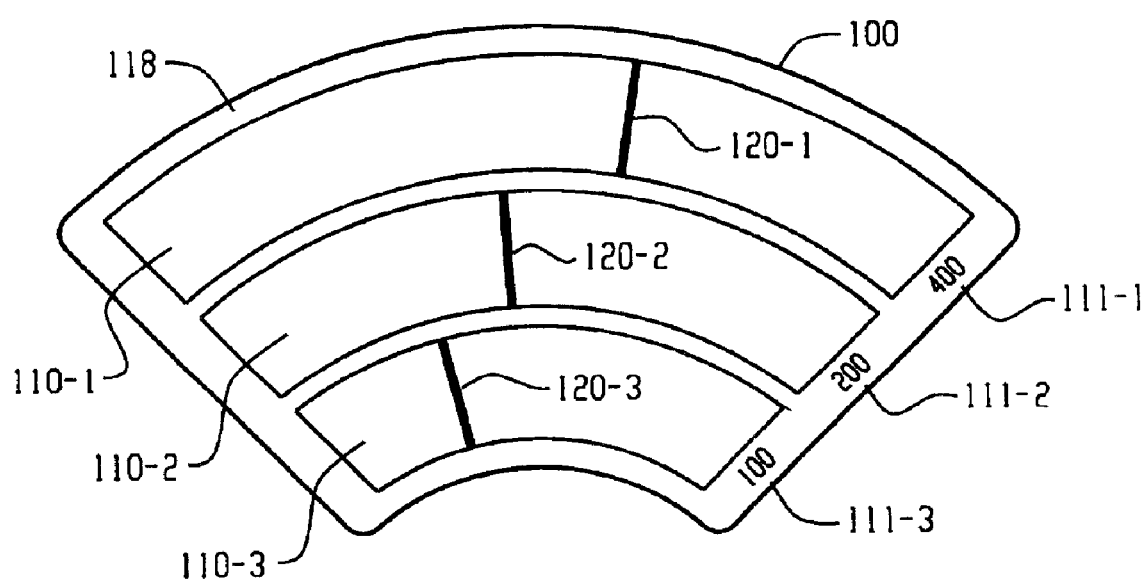
FIG. 18 is an exemplary graphical data display that does not include a display hub or a primary display band.

While examples have been used to disclose the invention, including the best mode, and also to enable any person skilled in the art to make and use the invention, the patentable scope of the invention is defined by the claims, and may include other examples that occur to those skilled in the art. For example, while the embodiments of FIGS. 3–16 have display hubs 130 and primary display bands 110-1, FIG. 18 shows a different embodiment of the graphical data display 100 that does not include the display hub 130 or the primary display band 110-1.

What is claimed is:

1. A graphical data display for facilitating analysis of a plurality of source data values with respect to a predetermined data characteristic, the graphical data display comprising:

a plurality of display bands, each of the display bands having a spatial arrangement with respect to each other in order to visually provide information regarding the predetermined data characteristic;

wherein at least one display band is a primary display band based upon the predetermined data characteristic; and a display indicator associated with each display band, said display indicator indicating a value in its associated display band based upon at least one of the source data values, each display band providing a range region within which the associated display indicator may indicate the value;

wherein the display indicator associated with the primary display band is indicative of a value that is dependent on the values indicated by the display indicators associated with the other display bands, the dependence based on a statistical characteristic of the values indicated by the display indicators associated with the other display bands.

2. The graphical data display of claim 1 wherein the primary display band has a spatial arrangement with respect to the other display bands such that the order of the primary display band relative to any other display band in the display is first.

3. The graphical data display of claim 1 wherein the primary display band has a spatial arrangement with respect to the other display bands such that the order of the primary display band relative to any other display band in the display is last.

4. A graphical data display for facilitating analysis of a plurality of source data values with respect to a predetermined data characteristic, the graphical data display comprising:

a plurality of display bands each of the display bands having a spatial arrangement with respect to each other in order to visually provide information regarding the predetermined data characteristic;

wherein at least one display band is a primary display band based upon the predetermined data characteristic; and a display indicator associated with each display band, said display indicator indicating a value in its associated display band based upon at least one of the source data values, each display band providing a range region within which the associated display indicator may indicate the value;

wherein the display indicator associated with the primary display band is a gauge needle style indicator and wherein the gauge needle style indicator substantially extends through the plurality of display bands.

5. The graphical data display of claim 4 wherein the display indicators associated with bands other than the primary display band are located within their associated display bands.

6. The graphical data display of claim 4 further comprising a display hub, the display hub displaying the value of the display indicator in the primary display band.

7. The graphical data display of claim 4 wherein the source data values comprise business reporting metrics.

8. The graphical data display of claim 4 wherein the source data values comprise network traffic reporting metrics.

9. A graphical data display device for facilitating analysis of a plurality of source data values with respect to a predetermined data characteristic, the graphical data display device comprising:

a storage device for storing a plurality of source data values;

a display device operable to display a plurality of display bands and a display indicator associated with each display band; and processing means operable to arrange each of the display bands with respect to each other according to a spatial arrangement in order to visually provide information regarding a predetermined data characteristic, said processing means arranging the display indicators so that each display indicator indicates a value in its associated display band based upon at least one of the source data values;

wherein at least one display band is a primary display band based upon the predetermined data characteristic, and each display band provides a range region within which the associated display indicator may indicate the value, and wherein the display indicator associated with the primary display band is a gauge needle style indicator that substantially extends through the plurality of display bands.

10. The graphical data display device of claim 9 wherein the display of the display indicator associated with the primary display band is more prominent than the display of the display indicator associated with another display band.

11. The graphical data display device of claim 9 wherein the display of the primary display band is more prominent than the display of another display band.

12. The graphical data display device of claim 9, wherein the processing means is further operable to obtain additional source data values and further arrange the display indicators so that each display indicator indicates a value in its associated display band based upon at least one of the additional source data values.

13. A graphical data display device for facilitating the graphical analysis of data, the device comprising:

a display device operable to display a plurality of radial display bands and a plurality of display indicators; and a storage device for storing a plurality of source data values;

wherein the plurality of display indicators corresponds to the plurality of radial display bands, and the graphical data display device is operable to create a graphical representation of a data characteristic of the plurality source data by arranging the plurality of radial display bands in radial disposition and positioning the plurality of display indicators in the corresponding plurality of radial display bands according to the data characteristic of the plurality of source data values, wherein at least one of the display indicators is associated with a first display band and extends radially across one or more other display bands to indicate a value within the first display band.

14. The graphical data display device of claim 13 wherein at least one display band is a primary display band based upon the predetermined data characteristic.

15. The graphical data display device of claim 14 wherein the display of the display indicator associated with the primary display band is more prominent than the display of the display indicator associated with another display band.

16. The graphical data display device of claim 15 wherein the display of the primary display band is more prominent than the display of another display band.

17. A graphical method for displaying and facilitating analysis of a plurality of source data values with respect to a predetermined data characteristic, comprising:

defining a display area;

arranging a plurality of display bands within the display area in a spatial arrangement with respect to each other to visually provide information regarding the predetermined data characteristic;

creating a display indicator in each of the display bands;

associating the display bands and the display indicators in each of the bands with the plurality of source data value to indicate a value in each associated display band;

defining a color gradient; and color coding the plurality of display bands according to the color gradient to visually emphasize one of the display bands.

18. The method of claim 17, further comprising:

defining range regions display bands; and color coding each of the range regions within the display bands.

19. The method of claim 18, wherein color coding each of the range regions within the display bands comprises color coding each of the range regions within the display bands to further visually emphasize one of the display bands.

20. The method of claim 17, wherein arranging a plurality of display bands within the display area in a spatial arrangement with respect to each other to visually provide information regarding the predetermined data characteristic comprises arranging the plurality of display bands in radial disposition.

21. The method of claim 17, wherein creating a display indicator in each of the display bands comprises:

associating a gauge needle style indicator with at least one of the display bands; and extending the gauge needle style indicator through one or more other display bands.

22. The method of claim 17, wherein arranging a plurality of display bands within the display area in a spatial arrangement with respect to each other to visually provide information regarding the predetermined data characteristic comprises:

increasing at least one dimension of one of the display bands with respect to the other display bands as the number of display bands displayed within the display area decreases; and decreasing the at least one dimension of the one of the display bands with respect to the other display bands as the number of display bands displayed increases.

23. The method of claim 17, wherein the predetermined data characteristic is a historical characteristic, and wherein color coding the plurality of display bands according to the color gradient to visually emphasize one of the display bands comprises visually emphasizing a most recent historical characteristic.

24. A computer-implemented method for facilitating historical analysis of a plurality of source data values with respect to a historical data characteristic, the method comprising:

generating a plurality of display bands;

generating a display hub;

defining at least one range region in each display band;

positioning the plurality of display bands in radial disposition with respect to each other and the display hub to visually provide information regarding the historical data characteristic;

generating a display indicator in each display band;

determining a value in each display band to be displayed based on a historical characteristic;

indicating each value in each display band with each display indicator, and associating one of the display indicators with the display hub.

25. The method of claim 24, wherein the historical characteristic is a chronological characteristic.

26. The method of claim 24, wherein the historical characteristic is an averaged characteristic.

27. The method of claim 24, wherein associating one of the display indicators with the display hub comprises:

associating a gauge needle style indicator with one of the display bands; and extending the gauge needle style indicator from the display hub to the one of the display bands.

28. The method of claim 27, further comprising displaying the value indicated by the gauge needle style indicator in the display hub.

29. The method of claim 24, wherein associating one of the display indicators with the display hub comprises:

providing visual indicia to visually distinguish the one of the display indicator, from the other display indicators; and displaying the value indicated by the one of the display indicators in the display hub.

* * * * *

UNITED STATES PATENT AND TRADEMARK OFFICE
CERTIFICATE OF CORRECTION

PATENT NO. : 6,900,808 B2  
DATED : May 31, 2005  
INVENTOR(S) : Lassiter et al.

Page 1 of 1

It is certified that error appears in the above-identified patent and that said Letters Patent is hereby corrected as shown below:

Column 12,
Line 50, after the first instance of "bands" insert a comma -- , --.

Column 13,
Line 62, before "source" insert -- of --.

Column 15,
Line 18, delete "indicator," and insert -- indicator; --.

Column 16,
Line 15, delete "indicator," and insert -- indicators --.

Signed and Sealed this

Sixteenth Day of August, 2005

JON W. DUDAS
*Director of the United States Patent and Trademark Office*